Sept. 9, 1947.  H. J. BLAIR  2,427,120
TWO WAY OVERRUNNING CLUTCH
Filed Nov. 26, 1945
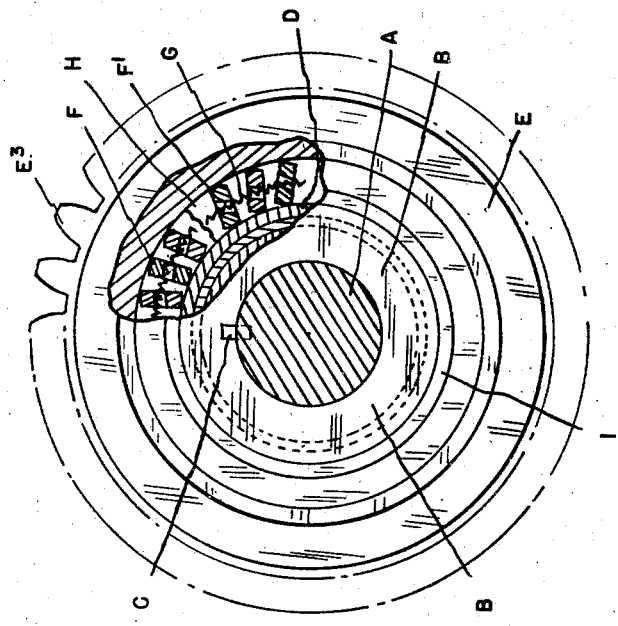
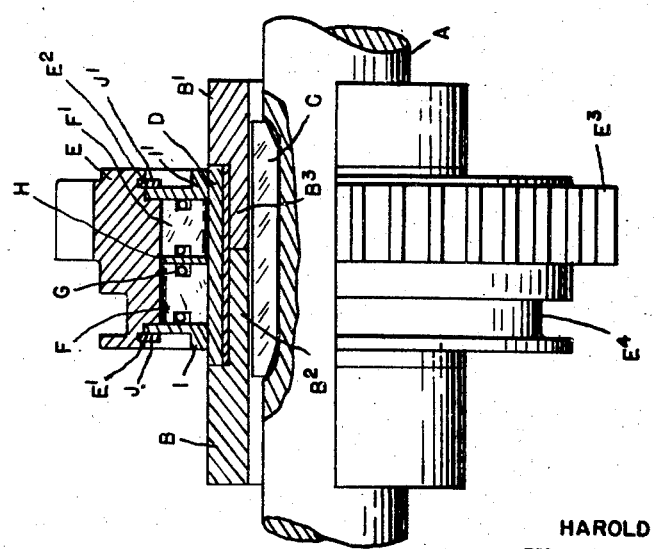
INVENTOR.
HAROLD J. BLAIR
BY
*Whittemore Hulbert & Belknap*
ATTORNEYS Patented Sept. 9, 1947

2,427,120

UNITED STATES PATENT OFFICE 2,427,120

TWO-WAY OVERRUNNING CLUTCH

Harold J. Blair, Pleasant Ridge, Mich., assignor to The Gear Grinding Machine Company, Hamtramck, Mich., a corporation of Michigan Application November 26, 1945, Serial No. 630,788

3 Claims. (Cl. 192—43)

The invention relates to the so-called over-running clutches characterized by the transmission of torque from a rotary driving member to a coaxial rotary driven member in one direction of rotation thereof without interference with the free rotation of the driven member in the same direction at a speed greater than that of the driving member.

Such clutches are sometimes designated as one-way clutches inasmuch as the torque transmission from one to the other is only in one way. However, there are mechanisms in which it is desirable to provide for the over-running of the driven member alternatively in opposite directions of rotation. It is, therefore, the object of the invention to obtain a clutch capable of such operation and to this end the invention consists in the construction as hereinafter set forth.

In the drawings:

Fig. 1 is a longitudinal section partly in elevation of my two way over-running clutch;

Fig. 2 is an end elevation thereof partly in section.

As specifically illustrated, A is a shaft. B and B' are cylindrical sleeve members mounted on the shaft A and coupled thereto by a key C. The adjacent portions $B^2$, $B^3$ of the members B and B' are reduced in diameter to receive an annular cylindrical member D having its peripheral surface flush with those of the members B and B'. Thus, while the members B and B' are coupled to revolve with the shaft A, the member D is free for independent revolution. E is an annular member surrounding the member D and radially spaced therefrom. F and F' are respectively one-way torque transmitting means between the members D and E, the direction of transmission of the one being opposite to that of the other. Preferably each of the means F and F' is constituted by a series of sprags which are inclined in opposite directions with respect to radial lines. Each series of sprags is energized to place the same in frictional contact with the opposed cylindrical surfaces or raceways of the members D and E by suitable means, such as garter springs G engaging notches in opposite ends of the sprags. The two series of sprags are placed adjacent to each other with only a disc bearing member H therebetween and retaining members I and I' are placed adjacent to the outer ends of the sprags in recesses E', $E^2$ in opposite ends of the member E. Spring rings J and J' engaging annular grooves in the member E serve to lock the members I and I' from displacement. The member E is provided with gear teeth $E^3$ or other suitable driving means for a conjugate member. Also the member E has a grooved extension $E^4$ for engaging with a fork or other suitable means for moving said member axially on the members B, B' and D.

With the construction as just described when the parts are in the position shown in Fig. 1, both of the torque transmitting means F and F' are between the member E and the member D and as the latter is freely revoluble, there will be no torque connection between the members B and B' and the member E. If, however, the member E is moved axially to bring the torque transmitting means F into engagement with the member B, the latter will transmit torque to said member E in one direction of rotation. However, if the member E is moved axially to place the torque transmitting means F' in engagement with the member B', then torque will be transmitted from the latter member to the member E in the opposite direction of rotation. In brief, torque may be transmitted between the shaft A and the member E alternatively in opposite directions according to the axial position of said member E and in each position the member E will be free to over-run the shaft A in one direction.

What I claim as my invention is:

1. A two way over-running clutch comprising a rotary member having spaced cylindrical peripheral portions, a freely revoluble member between said spaced portions with its peripheral surface flush therewith, an annular member spaced from and surrounding said freely revoluble member, a pair of adjacent one-way clutch means for transmitting torque respectively in opposite directions arranged between said annular member, and said freely revoluble member, and means for axially shifting said annular member together with said one-way clutch means to alternatively engage one or the other of the latter with the adjacent spaced peripheral portion of said rotary member to transmit torque in one direction between said portion and said annular member.

2. A two way over-running clutch comprising a rotary member having spaced cylindrical peripheral portions, a freely revoluble member between said spaced portions with its peripheral surface flush therewith, an annular member spaced from and surrounding said freely revoluble member, a pair of adjacent series of sprags for transmitting torque respectively in opposite directions arranged between said annular member and said freely revoluble member, means for holding said sprags in relation to said annular member, and means for axially shifting said annular member to alternatively engage one or the other of said series of sprags with the adjacent peripheral portion of said rotary member for the transmission of torque between the same and said annular member.

3. A two way over-running clutch comprising a rotary member, a pair of adjacent collars mounted thereon to rotate therewith, said collars having adjacent portions reduced in diameter to form an annular recess, a freely revoluble member located in said annular recess and having its peripheral surface flush with the peripheral surfaces of said collars, an annular member spaced from and surrounding said freely revoluble member, a pair of adjacent series of sprags between said annular member and freely revoluble member for respectively transmitting torque therebetween in opposite directions, end-thrust bearings at opposite ends of said series of sprags for retaining the same in relation with said annular member, and means for axially shifting said annular member to engage one or the other of said series of sprags with the peripheral surface of the collar adjacent thereto whereby torque may be transmitted between said annular member and rotary member alternatively in opposite directions.

HAROLD J. BLAIR.